United States Patent
Taylor et al.

(10) Patent No.: US 10,740,048 B2
(45) Date of Patent: Aug. 11, 2020

(54) SOFTWARE-AS-A-SERVICE DEPLOYMENT OF PRINTER DRIVERS AND PRINTER PROFILES

(71) Applicant: PrinterLogic, LLC, St. George, UT (US)

(72) Inventors: Jarrett David Taylor, Washington City, UT (US); Ryan George Wedig, St. George, UT (US); Corey Clint Ercanbrack, Washington City, UT (US); Devin Derrell Anderson, Washington City, UT (US)

(73) Assignee: PrinterLogic, Inc., St. George, UT (US)

( * ) Notice: Subject to any disclaimer, the term of this patent is extended or adjusted under 35 U.S.C. 154(b) by 0 days.

(21) Appl. No.: 15/423,358

(22) Filed: Feb. 2, 2017

(65) Prior Publication Data

US 2017/0228201 A1    Aug. 10, 2017

Related U.S. Application Data

(60) Provisional application No. 62/291,475, filed on Feb. 4, 2016.

(51) Int. Cl.
*G06F 3/12*   (2006.01)
*H04N 1/00*   (2006.01)
(Continued)

(52) U.S. Cl.
CPC .......... *G06F 3/1225* (2013.01); *G06F 3/1204* (2013.01); *G06F 8/61* (2013.01);
(Continued)

(58) Field of Classification Search
CPC . G06F 3/12; G06F 13/10; G06F 9/445; G06F 3/1204; G06F 3/1205;
(Continued)

(56) References Cited

U.S. PATENT DOCUMENTS 6,487,522 B1 * 11/2002 Smith .................. G06F 9/4411
                                                    702/122
7,689,673 B2 *  3/2010 Kemp .................. G06F 3/1204
                                                    709/220
(Continued)

OTHER PUBLICATIONS

PrinterLogic, PrinterLogic: Eliminating Print Servers, An Architectural and Use Case Overview, Introduction, Chapter 3, pp. 1 and 7-8, Published around 2015; see link: http://verity-group.com/wp-content/uploads/2017/04/150611-PrinterLogic-Eliminate-Print-Servers.pdf.*

(Continued)

*Primary Examiner* — Juan M Guillermety
(74) *Attorney, Agent, or Firm* — Austin Rapp

(57) ABSTRACT

A method for configuring, via a website, a computing device to communicate with a printer is described. The method includes creating, via the website, a printer definition for the printer. The printer definition includes a network address, a reference to a printer driver, and a reference to a printer profile. The method also includes sending an install uniform resource identifier (URI) associated with the printer definition. The method further includes receiving an indication that the install URI has been activated by the computing device. The method additionally includes sending an installer to the computing device. The installer installs the printer driver and configures the computing device to communicate with the printer using the network address, the printer driver and the printer profile.

30 Claims, 8 Drawing Sheets

(51) Int. Cl.
*G06F 8/61* (2018.01)
*G06F 9/4401* (2018.01)
*H04L 29/08* (2006.01)
*H04L 12/24* (2006.01)
*H04L 12/58* (2006.01)

(52) U.S. Cl.
CPC ........ *G06F 9/4411* (2013.01); *H04L 41/0253* (2013.01); *H04L 41/046* (2013.01); *H04L 41/0803* (2013.01); *H04L 67/02* (2013.01); *H04L 67/34* (2013.01); *H04N 1/00973* (2013.01); *H04L 51/04* (2013.01); *H04L 67/303* (2013.01)

(58) Field of Classification Search
CPC .... G06F 3/1285; G06F 3/1287; G06F 3/1288; G06F 9/4411; G06F 3/1227; G06F 3/1228; G06F 3/1231; G06F 3/1276; G06F 3/1203
See application file for complete search history.

(56) References Cited

U.S. PATENT DOCUMENTS

| | | | |
|---|---|---|---|
| 8,368,915 B1 | 2/2013 | Feeser | |
| 9,571,500 B1* | 2/2017 | Chachar | G06F 21/629 |
| 2003/0011801 A1* | 1/2003 | Simpson | G06F 3/1228 |
| | | | 358/1.13 |
| 2003/0160989 A1* | 8/2003 | Chapin | G06F 9/4411 |
| | | | 358/1.13 |
| 2003/0200291 A1 | 10/2003 | Kemp et al. | |
| 2003/0236871 A1* | 12/2003 | Thurlow | G06F 9/4411 |
| | | | 709/223 |
| 2004/0227973 A1 | 11/2004 | Taylor | |
| 2006/0173974 A1* | 8/2006 | Tang | H04L 63/029 |
| | | | 709/217 |
| 2006/0221380 A1 | 10/2006 | Pretz et al. | |
| 2010/0085599 A1* | 4/2010 | Nomura | G06F 3/1204 |
| | | | 358/1.15 |
| 2011/0126190 A1* | 5/2011 | Urbach | G06F 9/445 |
| | | | 717/178 |
| 2011/0242581 A1* | 10/2011 | Lee | G06F 3/1228 |
| | | | 358/1.15 |
| 2011/0252416 A1 | 10/2011 | Kobayashi | |
| 2012/0182573 A1* | 7/2012 | Mok | G06F 3/1204 |
| | | | 358/1.15 |
| 2012/0324539 A1* | 12/2012 | Rangachari | G06F 21/629 |
| | | | 726/4 |
| 2013/0047149 A1* | 2/2013 | Xu | G06F 21/53 |
| | | | 717/175 |
| 2013/0212464 A1* | 8/2013 | Kimura | G06F 3/1228 |
| | | | 715/234 |
| 2013/0265601 A1* | 10/2013 | Kaneko | G06F 9/4411 |
| | | | 358/1.13 |
| 2014/0089531 A1* | 3/2014 | Bhogal | G06F 9/4411 |
| | | | 710/8 |
| 2014/0181801 A1* | 6/2014 | Voronkov | G06F 8/61 |
| | | | 717/177 |
| 2014/0316990 A1 | 10/2014 | Winston | |
| 2015/0293769 A1* | 10/2015 | Zhong | G06F 9/445 |
| | | | 717/174 |
| 2017/0046147 A1* | 2/2017 | Neville | G06F 9/4411 |

OTHER PUBLICATIONS

Equitrac Corporation, "equitrac Office 4—equitrac Express 4—Intelligent Cost Recovery and Print Management Solutions—Equitrac Print & Copy Control 4.0.3 Setup Guide," Jun. 7, 2010.
LRS Output Management, "Reimagine Printing," Levi, Ray & Shoup, Inc., Stockholm, Sweden 2017.
Celiveo, "Celiveo," Jetmobile Ptd Ltd. 2016.
Celiveo, "Celiveo Enterprise serverless pull printing," Jetmobile Ptd Ltd. 2016.
LRS Output Management, "Centralized Driver Management," Levi, Ray & Shoup, Inc., Stockholm, Sweden 2017.
LRS Output Management, "Secure Printing," Levi, Ray & Shoup, Inc., Stockholm, Sweden 2017.
Equitrac Corporation, "equitrac Office 4—Intelligent Cost Recovery and Print Management Solutions—Equitrac Office 4.2.0 Administration Guide," Aug. 11, 2010.
PCS Print Control Software, "ROI Print Manager—ROI Configuration Guide," Arizona, US Jul. 28, 2008.
Print Control Software, Inc., "ROI Print Manager Feature Matrix," ROI Feature Matrix Feb. 2016.
Print Control Software, Inc., "ROI Print Manager Putting you in control of your Managed Print Services," Arizona, US, retrieved from the Internet URL: http://www.roiprintmanager.net/wp-content/uploads/2016/04/ROI-V4-Brochure-2pp.pdf Apr. 2016.
"ROI Print Manager—Manage Users—Save Money—Reduce Waste," webinar hosted by ROI Print Manager, listing of available webinars published at: http://www.roiprintmanager.net/newsevents/webinars-2/ Apr. 2017.
"ROI Print Server Elimination," webinar hosted by ROI Print Manager, listing of available webinars published at: http://www.roiprintmanager.net/newsevents/webinars-2/ Apr. 2017.
"Printer Driver Management," webinar hosted by ROI Print Manager, listing of available webinars published at: http://www.roiprintmanager.net/newsevents/webinars-2/ Apr. 2017.
Levi, Ray & Shoup, Inc., "Should I Remove It?—VPSX Printer Driver Management," www.shouldiremoveit.com/vpsc-printer-driver-management-128331-program.aspx, Reason Software Apr. 15, 2016.
LRS Output Management, "VPSX Simple, scalable enterprise output management," Levi, Ray & Shoup, Inc., Stockholm, Sweden 2015.
International Search Report and Written Opinion issued for PCT Application No. PCT/US2017/016554 dated Apr. 14, 2017.
PrinterLogic, "PrinterLogic: Eliminating Print Servers," retrieved from the Internet URL: http://go.printerlogic.com/e/39202/EliminatingPrintServersWP/ml24y/557413871, Mar. 22, 2017.
International Preliminary Report on Patentability issued for Application No. PCT/US2017/016554 dated Feb. 23, 2018.
Extended European Search Report issued for European Patent Application No. 17748293.2 dated May 22, 2019.
Pahmp, Mikael, "Definition of printer:raw-tcp: URLs for use with Service Location draft-ietf-svrloc-rawtcp-printer-scheme-01.txt", Axis Communications, Service Location Working Group, Internet Draft, Jun. 28, 1999.

* cited by examiner

SOFTWARE-AS-A-SERVICE DEPLOYMENT OF PRINTER DRIVERS AND PRINTER PROFILES

RELATED APPLICATIONS

This application is related to and claims priority from U.S. Provisional Patent Application Ser. No. 62/291,475, filed Feb. 4, 2016 for "SOFTWARE-AS-A-SERVICE DEPLOYMENT OF PRINT DRIVERS AND PRINTER PROFILES," which is incorporated herein by reference.

TECHNICAL FIELD

The present disclosure generally relates to computers and computer-related technology. More specifically, the present disclosure relates to software-as-a-service (SaaS) deployment of printer drivers and printer profiles.

BACKGROUND

Computer technologies continue to advance at a rapid pace. Computers commonly used include everything from hand-held computing devices to large multi-processor computer systems. These computers include software operating systems and applications that include user interfaces, in order to make them useful and accessible to an end user. Computers are increasingly linked with other computers and other devices, such as printers, through networks.

One increasingly prevalent model of software licensing and delivery is known as software-as-a-service (SaaS). In the SaaS model, software is centrally hosted and delivered on demand, for example, over the Internet.

One of the challenges involved with computers is configuring computers to communicate with printers. Configuring computers to communicate with printers may require a technician to configure each computer individually by installing printer drivers and configuring printer profiles. This can be a time-consuming process. Accordingly, systems and methods that enable SaaS deployment of printer drivers and printer profiles may be beneficial.

DETAILED DESCRIPTION

Figure 1:
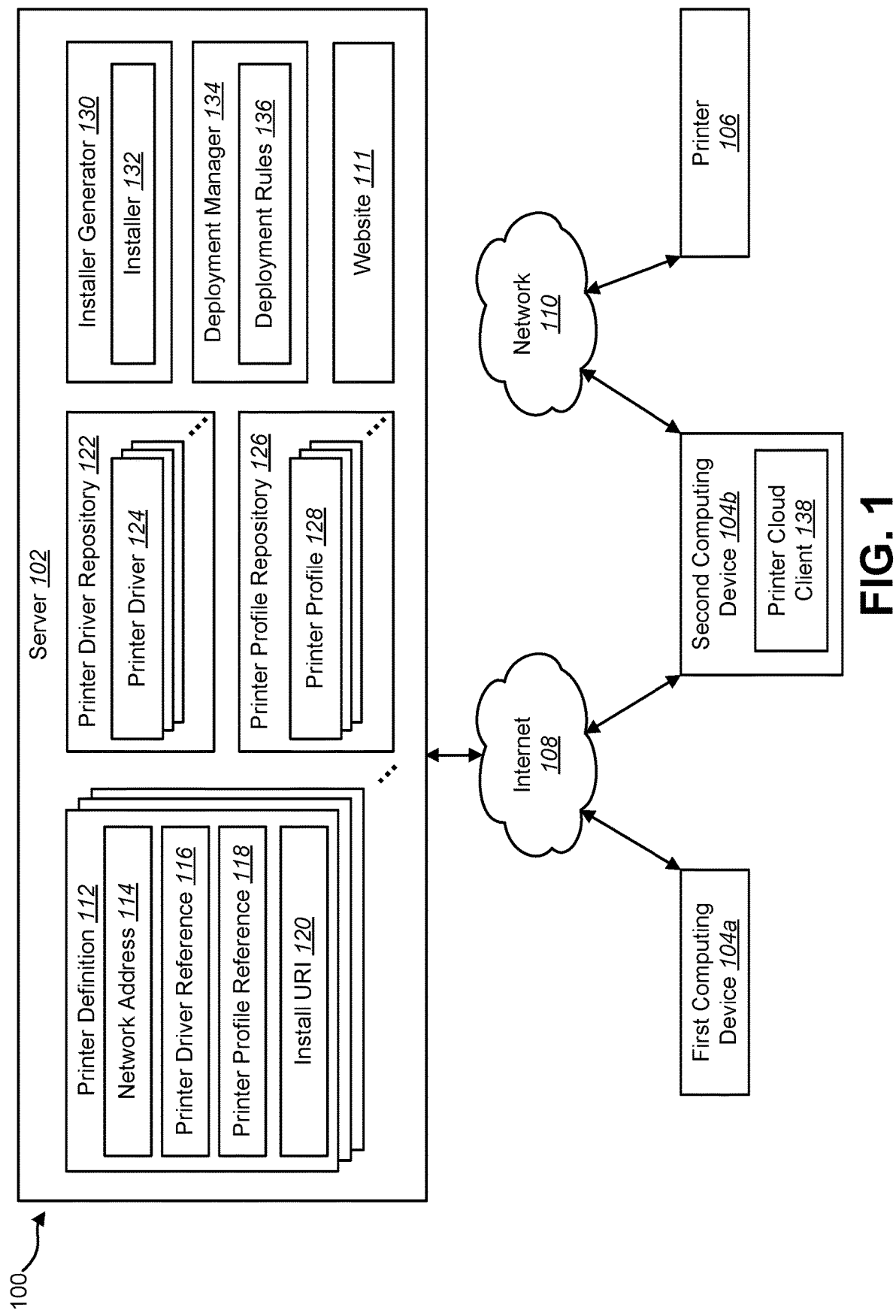
FIG. 1 is a block diagram illustrating one configuration of a system for software-as-a-service (SaaS) deployment of printer drivers and printer profiles.

A method for configuring, via a website, a computing device to communicate with a printer is described. The method includes creating, via the website, a printer definition for the printer. The printer definition includes a network address, a reference to a printer driver, and a reference to a printer profile. The method also includes sending an install uniform resource identifier (URI) associated with the printer definition. The method further includes receiving an indication that the install URI has been activated by the computing device. The method additionally includes sending an installer to the computing device. The installer installs the printer driver and configures the computing device to communicate with the printer using the network address, the printer driver and the printer profile.

Sending the install URI may include sending an email that includes the install URI.

Creating the printer definition may include receiving, via the website, the network address of the printer. Creating the printer definition may also include receiving, via the website, the printer driver for the printer. Creating the printer definition may further include receiving, via the website, the printer profile for the printer.

The printer driver may be stored in a repository. The reference to the printer driver may uniquely identify the printer driver in the repository.

The printer profile may be stored in a repository. The reference to the printer profile may uniquely identify the printer profile in the repository.

The network address may be an Internet Protocol (IP) address. The computing device may communicate with the printer via direct IP printing.

The printer profile may include one or more customized printer settings. The one or more customized printer settings may include one or more of tray options, paper options, paper sizes, duplex options, DPI settings, watermark options, name, comment, and location.

Configuring the computing device to communicate with the printer may include creating a network printer port based on the network address. Settings may be configured based on the printer profile.

An electronic device for configuring, via a website, a computing device to communicate with a printer is also described. The electronic device includes at least one processor configured to create, via the website, a printer definition for the printer. The printer definition includes a network address, a reference to a printer driver, and a reference to a printer profile. The at least one processor is also configured to send an install URI associated with the printer definition. The at least one processor is further configured to receive an indication that the install URI has been activated by the computing device. The at least one processor is additionally configured to send an installer to the computing device. The installer installs the printer driver and configures the computing device to communicate with the printer using the network address, the printer driver and the printer profile.

Another method for configuring, via a website, a computing device to communicate with a printer is described. The method includes receiving, via the website, a network address, a printer driver and a printer profile for the printer. The method also includes creating a printer definition for the printer that includes the network address, a reference to the printer driver, and a reference to a printer profile. The method further includes generating deployment rules based on the printer definition. The method additionally includes sending the deployment rules to a printer cloud client on a computing device to install the printer driver and printer profile for the printer.

Creating the printer definition may include creating the reference to the printer driver and the reference to the printer profile. The printer driver may be stored in a repository. The reference to the printer driver may uniquely identify the printer driver in the repository. The printer profile may be stored in a repository. The reference to the printer profile may uniquely identify the printer profile in the repository.

The deployment rules may include instructions for the printer cloud client on the computing device to install and configure the printer driver and the printer profile for the printer. The printer cloud client may be a software agent that exists on the computing device and is configured to communicate with a server via the Internet.

Another electronic device for configuring, via a website, a computing device to communicate with a printer is described. The electronic device includes at least one processor configured to receive, via the website, a network address, a printer driver and a printer profile for the printer. At least one processor is also configured to create a printer definition for the printer that includes the network address, a reference to the printer driver, and a reference to a printer profile. At least one processor is further configured to generate deployment rules based on the printer definition. The at least one processor additionally configured to send the deployment rules to a printer cloud client on a computing device to install the printer driver and printer profile for the printer.

Various configurations of the systems and methods are now described with reference to the Figures. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a system 100 for software-as-a-service (SaaS) deployment of printer drivers 124 and printer profiles 128. The system 100 includes a first computing device 104a, a second computing device 104b, a server 102 and a printer 106. The first computing device 104a and the second computing device 104b may communicate with the server 102 via the Internet 108.

A computing device 104 may be configured to communicate with a network 110. A computing device 104 (e.g., first computing device 104a and the second computing device 104b) may be a desktop computer, laptop computer, tablet computer, smartphone, etc.

In an implementation, a network 110 may be a small network. For example, the network 110 may include fifty or fewer printers 106. In another implementation, the network 110 may belong to a large organization where the network 110 may include different subnets and may be spread across different geographic regions.

One of the challenges involved with computing is configuring a computing device 104 to communicate with one or more printers 106 on a network 110. To properly communicate with a printer 106, a computing device 104 may be configured with a printer driver 124 and a printer profile 128.

A printer driver 124 may be software that converts data to be printed to a format specific for a printer 106.

A printer profile 128 may include one or more settings for a printer 106. The one or more settings may include tray options, paper options, paper sizes, duplex options, dots-per-inch (DPI) settings, watermark options, name, comment, location, etc. Therefore, a printer profile 128 may be a collection of customized printer settings or attributes.

Currently, configuring computers to communicate with printers 106 may require a service provider to configure each computing device 104 individually by installing the printer drivers 124 and configuring printer profiles 128 for each printer 106 on a network 110. This can be a time-consuming process. Furthermore, this process may be prone to error when being performed by a human. For example, a technician may enter incorrect information in a printer profile 128 or may associate the incorrect printer driver 124 with a given computing device 104.

In an approach, an organization may use a dedicated print server to connect printers 106 to computing devices 104 over a network 110. However, this approach requires adding additional hardware and software components to a network 110. This may introduce network complexity and expense. For example, an organization may need a dedicated information technology (IT) staff to configure and maintain a print server. For many organizations, especially smaller organizations, this additional complexity and expense is undesirable. For example, a company with ten people and two printers 106 and no IT staff may not want to buy, install and maintain a print server.

The systems and methods described herein provide for a SaaS deployment of printer drivers 124 and printer profiles 128. A server 102 may host a website 111 that is accessible via the Internet 108. The server 102 may include one or more printer definitions 112, a printer driver repository 122, a printer profile repository 126, an installer generator 130 and/or a deployment manager 134. Although illustrated as a single entity, the server 102 may include multiple entities. For example, the server 102 could comprise one or more load-balancing routers, one or more web servers, one or more application servers and one or more database servers in operable communication with each other.

The server 102 may also be referred to as a SaaS instance. For example, the server 102 may be a virtual server instance that is accessible from a public or private cloud network.

In a first aspect, the server 102 may create a printer definition 112 for one or more printers 106. A printer definition 112 may comprise a network address 114, one or more printer driver references 116, one or more printer profile references 118 and one or more install uniform resource identifiers (URI) 120. In an implementation, the network address 114 may be an Internet Protocol (IP) address of the printer 106. In another implementation, the network address 114 may include a hostname of the printer 106.

The printer driver reference 116 may uniquely identify a printer driver 124 stored in the printer driver repository 122. The printer profile reference 118 may uniquely identify a printer profile 128 stored in the printer profile repository 126.

The install URI 120 may specify an access mechanism and a location for downloading an installer 132 generated by the installer generator 130. In an implementation, the install URI 120 may include a Uniform Resource Locator (URL) or Uniform Resource Name (URN) that identifies the server 102 as a source for an installer 132 or deployment rules 136 to configure a printer 106.

The printer driver repository 122 may store one or more printer drivers 124. The printer profile repository 126 may store one or more printer profiles 128. As described above, a printer profile 128 may comprise one or more settings for a printer 106. The one or more settings may include tray options, paper options, paper sizes, duplex options, dots-per-inch (DPI) settings, watermark options, name, comment, location, etc.

In a second aspect, the server 102 may provide either an installer 132 or deployment rules 136 to configure a computing device 104 to communicate with the printer 106 using the printer definition 112. In a first implementation, the server 102 may include an installer generator 130.

The installer generator 130 may generate an installer 132 based on a printer definition 112. The installer 132 may be run by a computing device 104. Running the installer 132 may configure the computing device 104 to communicate with a printer 106. Configuring the computing device 104 to communicate with the printer 106 may comprise creating a network printer port based on the network address 114 in the printer definition 112, installing the printer driver 124 referenced in the printer definition 112, and configuring settings for the printer 106 based on the printer profile 128 referenced in the printer definition 112.

In one configuration, a service provider may utilize a SaaS deployment of printer drivers 124 and printer profiles 128 to simplify the delivery of print services to an organization. An example of a service provider includes a managed print services (MPS) that provides print services to a user (e.g., customer). Another example of a service provider is an information technology (IT) administrator that provides IT services to an organization.

The service provider may use the first computing device 104*a* to access a website 111 hosted by the server 102 via the Internet 108. The service provider may use the website 111 to create a printer definition 112 for a printer 106 that has been or will be provided to a user. The service provider may specify a network address 114 (e.g., IP address or hostname) for the printer 106. The service provider may upload one or more printer drivers 124 for the printer 106. This may include separate printer drivers 124 for different operating systems (e.g., Microsoft Windows, Mac OS X, Linux, etc.), different versions of operating systems (e.g., Windows XP, Windows Vista, Windows 7, Windows 8, Windows 10, etc.), and different computing systems (e.g., 32-bit, 64-bit, etc.), etc. The service provider may additionally upload one or more printer profiles 128 for the printer 106.

To upload a printer profile 128, the service provider may download and temporarily install the printer driver 124 on the first computing device 104*a*. The service provider may then configure the printer profile 128 on the first computing device 104*a*. The printer profile 128 on the first computing device 104*a* may then be used to generate a specific printer profile 128 for the printer 106 that may be uploaded to the website 111.

After creating the printer definition 112, the server 102 may send an install URI 120 to the second computing device 104*b* via the Internet 108. In an implementation, the install URI 120 may be sent in an email, a text message, an instant message, etc. In another implementation, the install URI 120 may be added to a deployment rule 136, as described below.

The user may receive the install URI 120 on the second computing device 104*b*. The user may activate the install URI 120. For example, the user may click on a link in an email. The second computing device 104*b* may send an indication to the server 102 that the install URI 120 has been activated by the user.

The server 102 may generate an installer 132 based on the printer definition 112 and send the installer 132 to the second computing device 104*b*. In some configurations, the installer 132 is generated when the server 102 receives the indication. In other configurations, the server 102 generates the installer 132 prior to receipt of the indication. Activating the install URI 120 may cause the second computing device 104*b* to download the installer 132.

The second computing device 104*b* may next prompt the user to run the installer 132. The installer 132 may create a network printer port on the second computing device 104*b* based on the network address 114, install the printer driver 124, and configure the settings for the printer 106 based on the printer profile 128. After the installer 132 has completed, the second computing device 104*b* may be configured to communicate with the printer 106 over the network 110. In other words, the second computing device 104*b* may be configured to print using the printer 106.

In a second implementation, the server 102 may include a deployment manager 134 that may communicate with a printer cloud client 138 on a computing device 104. The printer cloud client 138 may be a software agent that exists on a computing device 104. The printer cloud client 138 may be configured to communicate with the server 102 via the Internet 108. In this example, the second computing device 104*b* includes the printer cloud client 138.

The deployment manager 134 may generate deployment rules 136 for a given printer 106 based on the printer definition 112. Deployment rules 136 may be assigned to printers 106 and are used to determine if a printer driver 124 or printer profile 128 should be installed on the computing device 104. These deployment rules 136 may be created by the administrator and associated with the printer definition 112 of a given printer 106.

In an implementation, the deployment rules 136 can target a specific hostname, group of users, a range of IP address, MAC address or an Active Directory container, organizational unit (OU), computer, user, group, etc. The deployment manager 134 may include targeting rules to determine which computing devices 104 should have a printer 106 installed. On the server 102, an administrator may assign a deployment rule 136 to the defined printer 106 and/or profile 128. When the printer cloud client 138 checks in with the server 102, the printer cloud client 138 may consider the deployment rules 136. If a deployment rule 136 applies to the computing device 104 or user, the printer driver 124 and printer profile 128 may be installed.

The server 102 may send the deployment rules 136 to the printer cloud client 138. The deployment rules 136 may include instructions for the printer cloud client 138 to install and configure a printer driver 124 and printer profile 128 for a given printer 106. In an implementation, the deployment rules 136 may include information included in a printer definition 112. For example, the deployment rules 136 may include an install URI 120.

In an implementation, the printer definition 112 may include a list of computing devices 104 that are to be configured to communicate with a given printer 106. For example, a service provider may indicate, via the website 111, which computing devices 104 should be configured to print to a given printer 106. The server 102 may maintain a list of these computing devices 104 in the printer definition 112.

After creating the printer definition 112 for the printer 106, the server 102 may send the deployment rules 136 to the printer cloud client 138. For example, the server 102 may send an install URI 120 to the second computing device 104b via the Internet 108. In an implementation, the server 102 may only send the deployment rules 136 to the printer cloud client 138 that requests them. One or more printer cloud clients 138 may check in with the sever 102 for things to do on a configurable basis.

Upon receiving the deployment rules 136, the printer cloud client 138 may create a network printer port on the second computing device 104b based on the network address 114. The printer cloud client 138 may also contact the server 102 to acquire a printer driver 124 and a printer profile 128 for the printer 106. The printer cloud client 138 may install the printer driver 124, and configure the settings for the printer 106 based on the printer profile 128. After the printer cloud client 138 has completed, the second computing device 104b may be configured to communicate with the printer 106 over the network 110. In other words, the second computing device 104b may be configured to print using the printer 106.

In this implementation, rather than force an end-user to click an email or go to a portal and select to install the printer 106, the printer cloud client 138 may perform the printer driver 124 installation and configuration.

The systems and methods described herein may be especially beneficial with smaller organizations that may have fewer than fifty printers 106 and may not have dedicated information technology (IT) staff. However, benefits may be realized by larger organizations that wish to simplify printer management. Additionally, the SaaS deployment may be printer agnostic (i.e., include support for all printer brands and models), whereas print servers may be limited in the types of printers 106 supported. The described systems and methods provide automated printer installation without the use of a print server. This provides consistent results for deploying a printer 106 in an organization while keeping costs and network overhead down.

Figure 2:
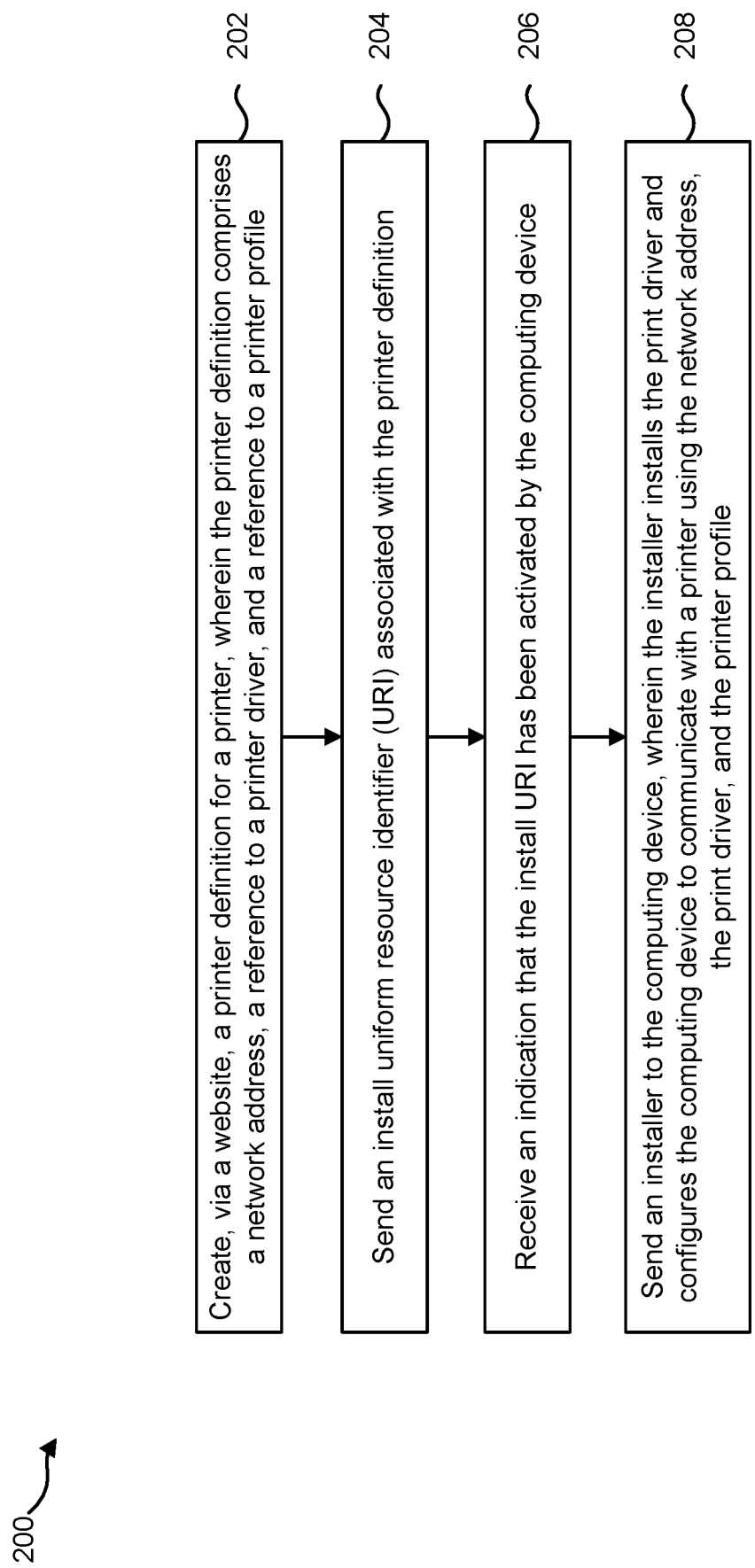
FIG. 2 is a flow diagram illustrating one configuration of a method for SaaS deployment of printer drivers and printer profiles.

FIG. 2 is a flow diagram illustrating one configuration of a method 200 for software-as-a-service (SaaS) deployment of printer drivers 124 and printer profiles 128. The method 200 may enable a computing device 104 to communicate with a printer 106 by receiving printer drivers 124 and printer profiles 128 from a central host, for example, via the Internet 108. The method 200 may be implemented by a server 102 in communication with a first computing device 104a and/or a second computing device 104b.

The server 102 may create 202, via a website 111, a printer definition 112 for a printer 106. For example, the first computing device 104a may communicate with the server 102 via the website 111 to specify the network address 114 (e.g., IP address or hostname) of the printer 106. The first computing device 104a may also upload a printer driver 124 and a printer profile 128 associated with the printer 106. In an example, a service provider using the first computing device 104a may provide the network address 114, the printer driver 124 and printer profile 128 to the server 102 via the website 111.

The printer definition 112 may comprise a network address 114, one or more printer driver references 116, one or more printer profile references 118 and one or more install uniform resource identifiers (URI) 120. A printer driver reference 116 may uniquely identify a printer driver 124 stored in a printer driver repository 122. The printer profile reference 118 may uniquely identify a printer profile 128 stored in a printer profile repository 126.

The server 102 may send 204 an install URI 120 associated with the printer definition 112. The install URI 120 may specify an access mechanism and a location for downloading an installer 132 generated by the installer generator 130. The server 102 may send 204 the install URI 120 in an email, a text message, an instant message, etc.

The server 102 may receive 206 an indication that the install URI 120 has been activated by the second computing device 104b. For example, a user of the second computing device 104b may click on a link in an email. The second computing device 104b may send an indication to the server 102 that the install URI 120 has been activated by the user.

The server 102 may send 208 an installer 132 to the second computing device 104b. The installer 132 may install the printer driver 124 and configure the second computing device 104b to communicate with a printer 106 using the network address 114, the printer driver 124 and the printer profile 128.

Figure 3:
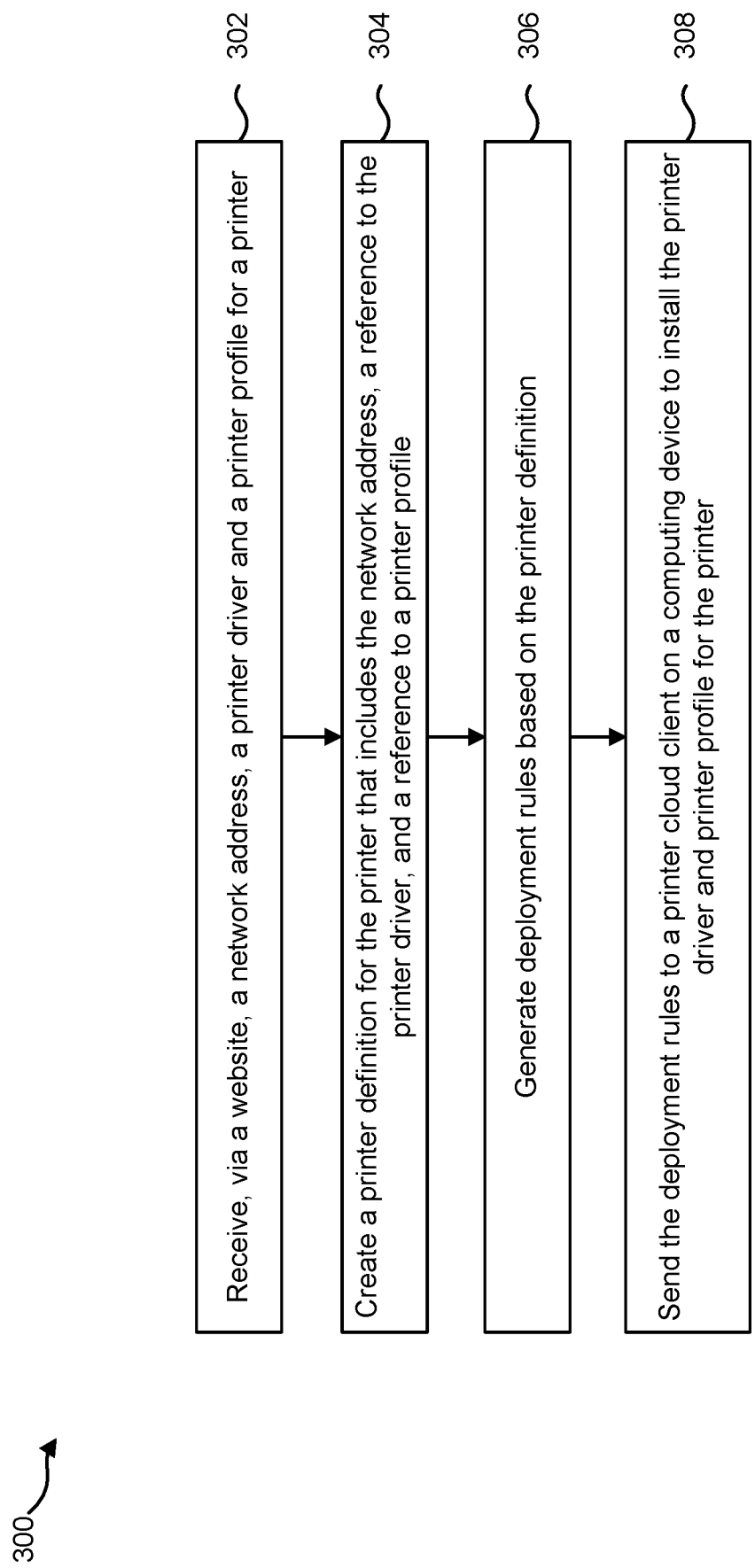
FIG. 3 is a flow diagram illustrating another configuration of a method for SaaS deployment of printer drivers and printer profiles.

FIG. 3 is a flow diagram illustrating another configuration of a method 300 for SaaS deployment of printer drivers 124 and printer profiles 128. The method 300 may be implemented by a server 102 in communication with a first computing device 104a and/or a second computing device 104b.

The server 102 may receive 302, via a website 111, a network address 114, a printer driver 124 and a printer profile 128 for a printer 106. For example, the first computing device 104a may communicate with the server 102 via the website 111 to specify the network address 114 (e.g., IP address or hostname) of the printer 106. The first computing device 104a may also upload a printer driver 124 and a printer profile 128 associated with the printer 106.

The server 102 may create 304, via a website 111, a printer definition 112 for the printer 106. This may be accomplished as described in connection with FIG. 2.

The server 102 may generate 306 deployment rules 136 based on the printer definition 112. The deployment rules 136 may include instructions for a printer cloud client 138 on a computing device 104 to install and configure a printer driver 124 and printer profile 128 for a given printer 106.

The server 102 may send 308 the deployment rules 136 to the printer cloud client 138 on the computing device 104 to install the printer driver 124 and the printer profile 128 for the printer 106. The printer cloud client 138 may follow the deployment rules 136 to contact the server 102. The server 102 may send the printer driver 124 and the printer profile 128 to the printer cloud client 138. The printer cloud client 138 may then install the printer driver 124 on the computing device 104 with the settings included in the printer profile 128.

Figure 4:
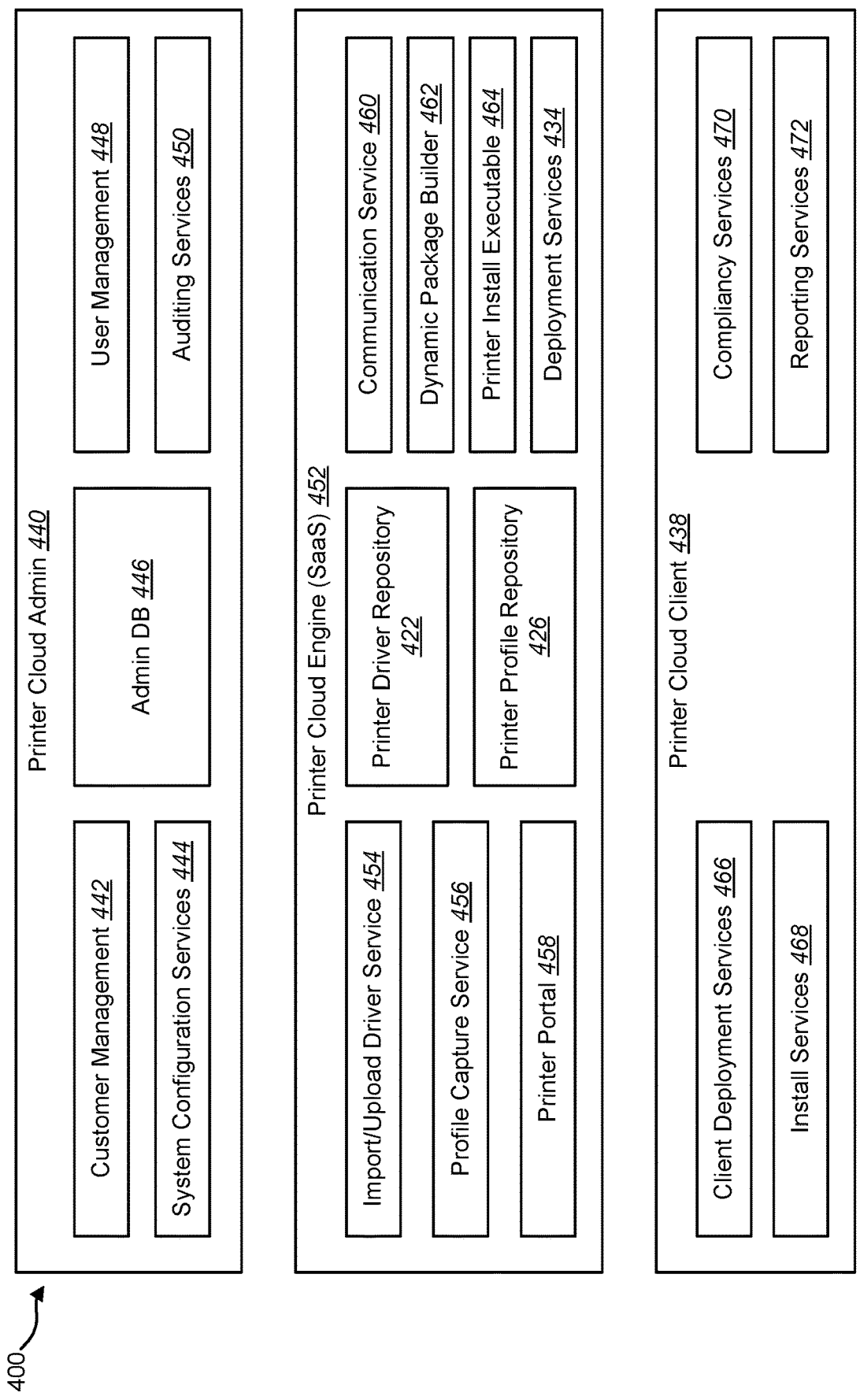
FIG. 4 is a block diagram illustrating a software architecture for SaaS deployment of printer drivers and printer profiles.

FIG. 4 is a block diagram illustrating a software architecture 400 for SaaS deployment of printer drivers 424 and printer profiles 428. The architecture 400 includes a printer cloud admin module 440, a printer cloud engine module 452 and a printer cloud client module 438.

The printer cloud admin module 440 may include a customer management component 442, a system configuration services component 444, an admin database 446, a user management component 448 and an auditing services component 450. In an implementation, the printer cloud admin module 440 may be run on a server 102.

The customer management component 442 may enable management of customers via a website 111. For example, using the customer management component 442, a service provider may view and edit details about one or more customers on the website 111 from a first computing device 104a.

The system configuration services component 444 may enable configuration of the website 111 for use by a service provider. For example, the system configuration services component 444 may enable configuration of a default email template, etc.

The user management component 448 may enable management of users of the website 111 (e.g., service providers, IT administrators, etc.). The auditing services component 450 may monitor changes that happen on the system, for example, via the website 111.

The admin database 446 may store data used by the customer management component 442, the system configuration services component 444, the user management component 448 and the auditing services component 450.

The printer cloud engine module 452 may comprise an import/upload driver service component 454, a profile capture service component 456, a printer portal component 458, a communication service component 460, a dynamic package builder component 462, a printer install executable 464, a printer driver repository 422, a printer profile repository 426 and a deployment service component 434. In an implementation, the printer cloud engine module 452 may be run on a server 102.

The import/upload driver service component 454 may enable uploading printer drivers 124 to the printer driver repository 422. For example, the import/upload driver service component 454 may enable a service provider to upload a printer driver 124 from a first computing device 104a to the printer driver repository 422 via the website 111.

The profile capture service component 456 may enable capturing a printer profile 128 from a computing device 104 or manually editing or creating a printer profile 128 for upload to the printer profile repository 126. For example, the profile capture service component 456 may provide an interface on the website 111 through which a service provider may view, enter or edit a printer profile 128 that is saved in the printer profile repository 126. The profile capture service component 456 may also capture one or more printer profiles 128 that are configured on the first computing device 104a and may save the captured printer profiles 128 in the printer profile repository 126.

The printer portal component 458 may enable display on the website 111 of printers 106 with printer drivers 124 and printer profiles 128 in the printer driver repository 122 and printer profile repository 126. The printer portal component 458 may also enable one or more printers 106 to be associated with a given user (e.g., customer). For example, using the website 111, a service provider may associate a given printer 106 with a user.

The communication service component 460 may enable sending an install URI 120 to a computing device 104 or user. For example, the communication service component 460 may generate and send an email to an email account associated with a user. The email may include the install URI 120. The service provider may enter details about a user's email account via the website 111.

The dynamic package builder component 462 may dynamically generate a package that includes an installer 132 for installing a printer driver 124 and a printer profile 128. The printer install executable 464 may be the generated installer 132.

The deployment services component 434 may communicate with a printer cloud client 438 on a computing device 104. The deployment services component 434 may generate deployment rules 136 for a given printer 106 based on the printer definition 112 and desired targeting rules.

The printer cloud client 438 may be a software agent that exists on a computing device 104. The printer cloud client 438 may include a client deployment services component 466, an install services component 468, a compliancy services component 470 and a reporting services component 472.

If a service provider (e.g., MPS, IT administrator, etc.) chooses to install the printer cloud client 438 and assigns a printer 106 to be deployed to a given computing device 104 or user, the client deployment services component 466 checks in with the server 102 and verifies that a printer driver 124 needs to be installed. The client deployment services component 466 may automatically download deployment rules 136, the printer driver 124 and the printer profile 128 from the server 102.

The install services component 468 may be used to install the printer driver 124 and the printer profile 128. For example, the install services component 468 may implement the deployment rules 136 received from the server 102 to install the printer driver 124 and the printer profile 128 on the computing device 104. This may include creating a network printer port based on the network address 114 in the printer definition 112, installing the printer driver 124 referenced in the printer definition 112, and configuring settings for the printer 106 based on the printer profile 128 referenced in the printer definition 112.

The compliancy services component 470 may check to ensure that the printer 106 is installed and configured. This may include verifying that the printer driver 124 and printer profile 128 are installed. For example, if an end-user removes the printer driver 124, the compliancy services component 470 may identify this change and cause the printer cloud client 438 to re-install the printer driver 124.

The reporting services component 472 may collect data about print jobs printed and send it back to the server 102. For example, when a user prints using a configured printer 106, the reporting services component 472 may report details about the print job back to the server 102. These details may include which printer 106 was used, the number of pages printed, the type of paper used, a timestamp of the print job, etc.

Figure 5:
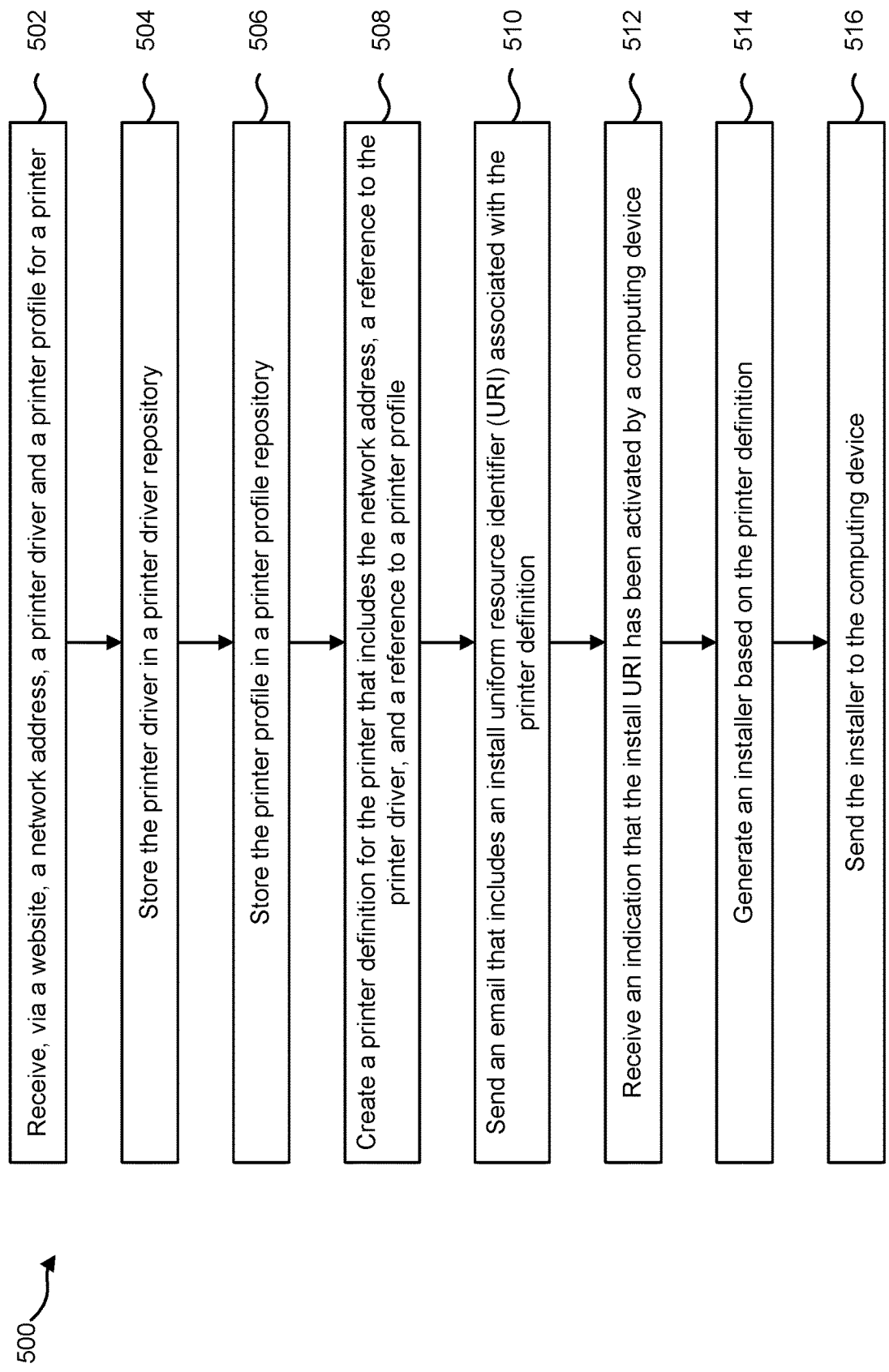
FIG. 5 is a flow diagram illustrating another configuration of a method for SaaS deployment of printer drivers and printer profiles.

FIG. 5 is a flow diagram illustrating another configuration of a method 500 for software-as-a-service (SaaS) deployment of printer drivers 124 and printer profiles 128. The method 500 may enable a computing device 104 to communicate with a printer 106 by receiving printer drivers 124 and printer profiles 128 from a central host, for example, via the Internet 108. The method 500 may be implemented by a server 102 in communication with a first computing device 104a and/or a second computing device 104b.

The server 102 may receive 502, via a website 111, a network address 114, a printer driver 124 and a printer profile 128 for a printer 106. For example, a service provider using a first computing device 104a may communicate with the server 102 via the website 111 to specify the network address 114 (e.g., IP address or hostname) of the printer 106. The first computing device 104a may also upload a printer driver 124 and a printer profile 128 associated with the printer 106.

The server 102 may store 504 the printer driver 124 in a printer driver repository 122. The printer driver repository 122 may include one or more printer drivers 124 associated with one or more printers 106.

The server 102 may store 506 the printer profile 128 in a printer profile repository 126. The printer profile repository 126 may include one or more printer profiles 128 associated with one or more printers 106.

The server 102 may create 508 a printer definition 112 for the printer 106. The printer definition 112 may include the network address 114, one or more printer driver references 116, one or more printer profile references 118 and one or more install uniform resource identifiers (URI) 120. A printer driver reference 116 may uniquely identify a printer driver 124 stored in a printer driver repository 122. The printer profile reference 118 may uniquely identify a printer profile 128 stored in a printer profile repository 126.

The server 102 may send 510 an email that includes an install uniform resource identifier (URI) 120 associated with the printer definition 112. For example, the server 102 may generate an email based on user information stored in the server 102 and/or supplied by a service provider via the website 111. In an example, the install URI 120 may be a URL for downloading an installer 132 generated by the server 102.

The server 102 may receive 512 an indication that the install URI 120 has been activated by a computing device 104. For example, a user of a second computing device 104b may click on an install URI 120 link in the email. The second computing device 104b may send an indication to the server 102 that the install URI 120 has been activated by the user.

The server 102 may generate 514 an installer 132 based on the printer definition 112. The installer 132 may be an executable file that includes instructions to install the printer driver 124 and configure the second computing device 104b to communicate with a printer 106 using the network address 114, the printer driver 124 and the printer profile 128. The installer 132 may include the printer driver 124, and the printer profile 128. In an implementation, the server 102 may dynamically generate 514 the installer 132 in response to receiving the indication from the computing device 104 that the install URI 120 has been activated. In another implementation, the server 102 may generate 514 the installer 132 before receiving the indication from the computing device 104.

The server 102 may send 516 the installer 132 to the computing device 104. For example, the computing device 104 may download the installer 132 from the server 102. Upon receiving the installer 132 a user may run the installer 132 to install and configure the printer 106.

Figure 6:
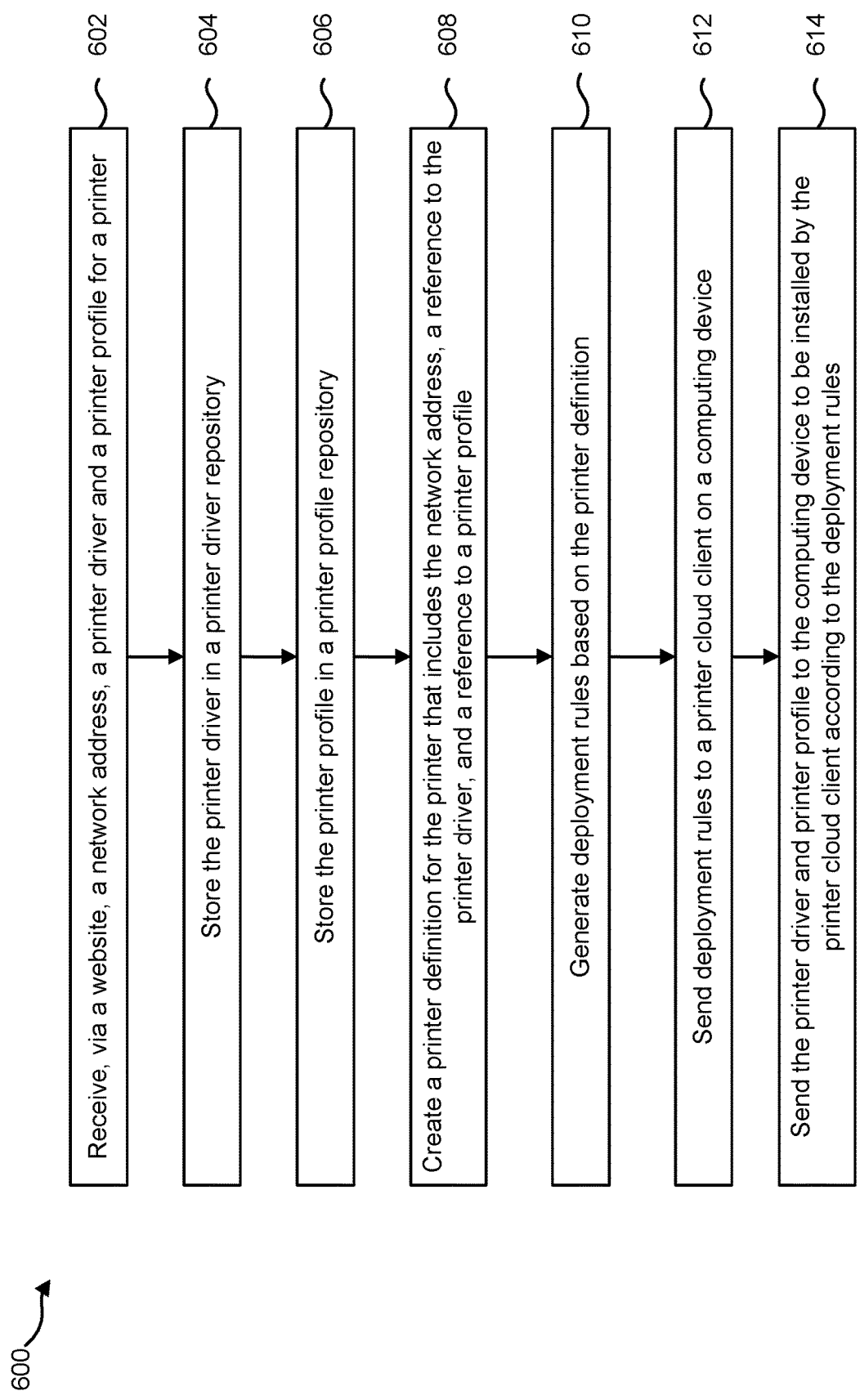
FIG. 6 is a flow diagram illustrating yet another configuration of a method for SaaS deployment of printer drivers and printer profiles.

FIG. 6 is a flow diagram illustrating yet another configuration of a method 600 for software-as-a-service (SaaS) deployment of printer drivers 124 and printer profiles 128. The method 600 may be implemented by a server 102 in communication with a first computing device 104a and/or a second computing device 104b.

The server 102 may receive 602 via a website 111, a network address 114, a printer driver 124 and a printer profile 128 for a printer 106. For example, a service provider using a first computing device 104a may communicate with the server 102 via the website 111 to provide the network address 114 one or more printer drivers 124 and one or more printer profiles 128 associated with the printer 106.

The server 102 may store 604 the printer driver 124 in a printer driver repository 122. The server 102 may store 606 the printer profile 128 in a printer profile repository 126.

The server 102 may create 608 a printer definition 112 for the printer 106 that includes the network address 114, one or more printer driver references 116, one or more printer profile references 118 and one or more install uniform resource identifiers (URI) 120. This may be accomplished as described in connection with FIG. 5.

The server 102 may generate 610 deployment rules 136 based on the printer definition 112. The deployment rules 136 may include instructions for a printer cloud client 138 on a computing device 104 to install and configure a printer driver 124 and printer profile 128 for a given printer 106.

The printer definition 112 may further include a list of computing devices 104 that are to be configured to communicate (i.e., print) with the printer 106. The deployment rules 136 may be assigned to one or more printers 106 and are used to determine if the printer driver 124 or printer profile 128 should be installed on a computing device 104. These deployment rules 136 may be created by an administrator at the server 102 and associated with a printer definition 112.

The server 102 may send 612 the deployment rules 136 to the printer cloud client 138 on a computing device 104. In an implementation, the server 102 may initiate (i.e., push) the transfer of the deployment rules 136 to the printer cloud client 138. In another implementation, the printer cloud client 138 may initiate (i.e., pull) the transfer of the deployment rules 136 from the server 102.

The server 102 may send 614 the printer driver 124 and printer profile 128 to the computing device 104 to be installed by the printer cloud client 138 according to the deployment rules 136. For example, upon receiving the deployment rules 136, the printer cloud client 138 may establish a link with the server 102, which sends 614 the printer driver 124 and printer profile 128. The printer cloud client 138 may create a network printer port based on the network address 114 in the printer definition 112, install the printer driver 124 referenced in the printer definition 112, and configure settings for the printer 106 based on the printer profile 128 referenced in the printer definition 112.

Figure 7:
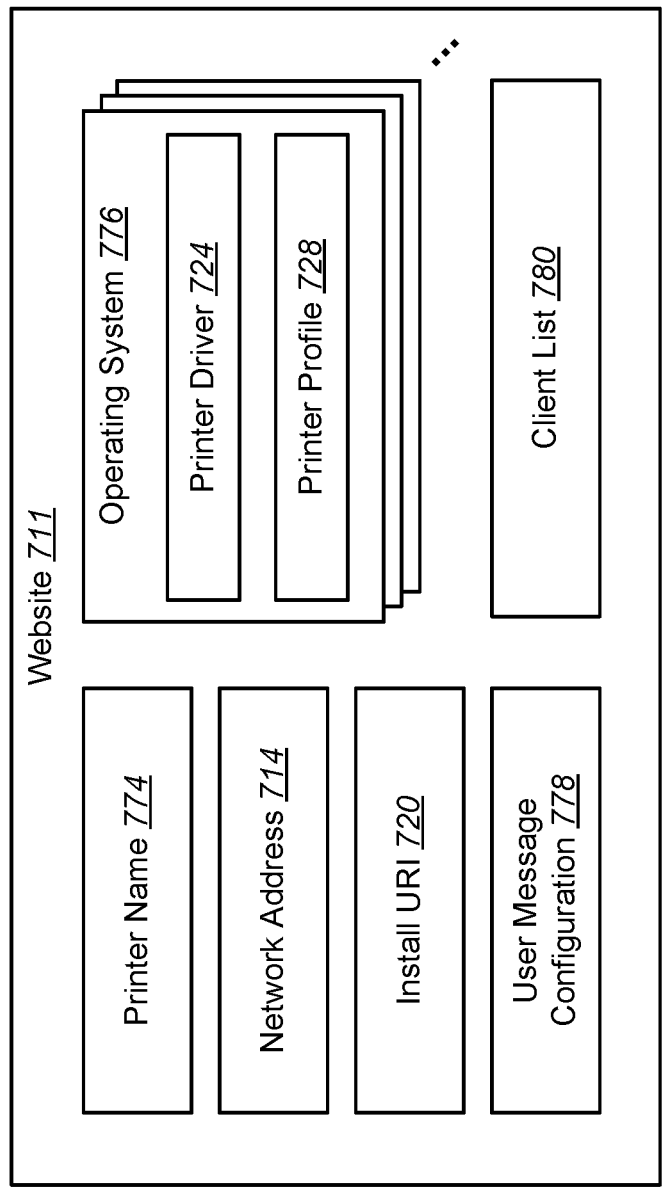
FIG. 7 is a block diagram illustrating a configuration of a website for SaaS deployment of printer drivers and printer profiles.

FIG. 7 is a block diagram illustrating a configuration of a website 711 for software-as-a-service (SaaS) deployment of printer drivers 724 and printer profiles 728. The website 711 may be hosted by a server 102. The website 711 may be accessible via the Internet 108.

The website 711 may display one or more webpages and/or dialog boxes. A service provider may access the website 711 to enter information about a printer 106 and provide one or more printer drivers 724 and one or more printer profiles 728.

The website 711 may provide one or more webpages for creating a printer definition 112 for a printer 106. The website 711 may provide a printer name component 774 and a network address component 714. The printer name component 774 may be an element (e.g., textbox) for entering the name of the printer 106. The network address component 714 may be an element for entering the network address 114 (e.g., IP address or hostname) of the printer 106.

The website 711 may also include one or more operating system components 776. An operating system component 776 may define a certain operating system that may be used by a computing device 104. For example, one operating system component 776 may be used for Windows and another operating system component 776 may be used for Mac OS.

A printer driver 724 and printer profile 728 configured for a particular operating system may be included in the operating system component 776 for that particular operating system. For example, a service provider may upload a new printer driver 724 on the website 711. The uploaded printer driver 724 may be associated with the operating system that the service provider selects.

The website 711 may also provide additional components associated with creating a printer definition 112. These components may include a printer location element and comments about a printer 106.

The website 711 may provide one or more dialog boxes for selecting a printer driver 124 to associate with a printer 106. The website 711 may provide one or more dialog boxes for specifying options for a printer profile 128. The website 711 may provide a webpage for listing information about a printer definition 112, including an install URI 720.

The website 711 may provide a client list 780 that displays one or more clients (e.g., customers) and the printers 106 that are associated with a given client. In an implementation, the client list 780 may be in the form of a drop down tree, where each client has a subset of printer 106. The website 711 may include elements (e.g., check boxes) that allow a service provider to select one or more clients and/or printers 106 for SaaS-based deployment of printer drivers 724 and printer profiles 728.

The website 711 may also provide a user message configuration component 778 that enables the configuration of messages sent to an end-user. For example, the user message configuration component 778 may be a webpage that enables a service provider to configure an email that is sent to an end user.

Figure 8:
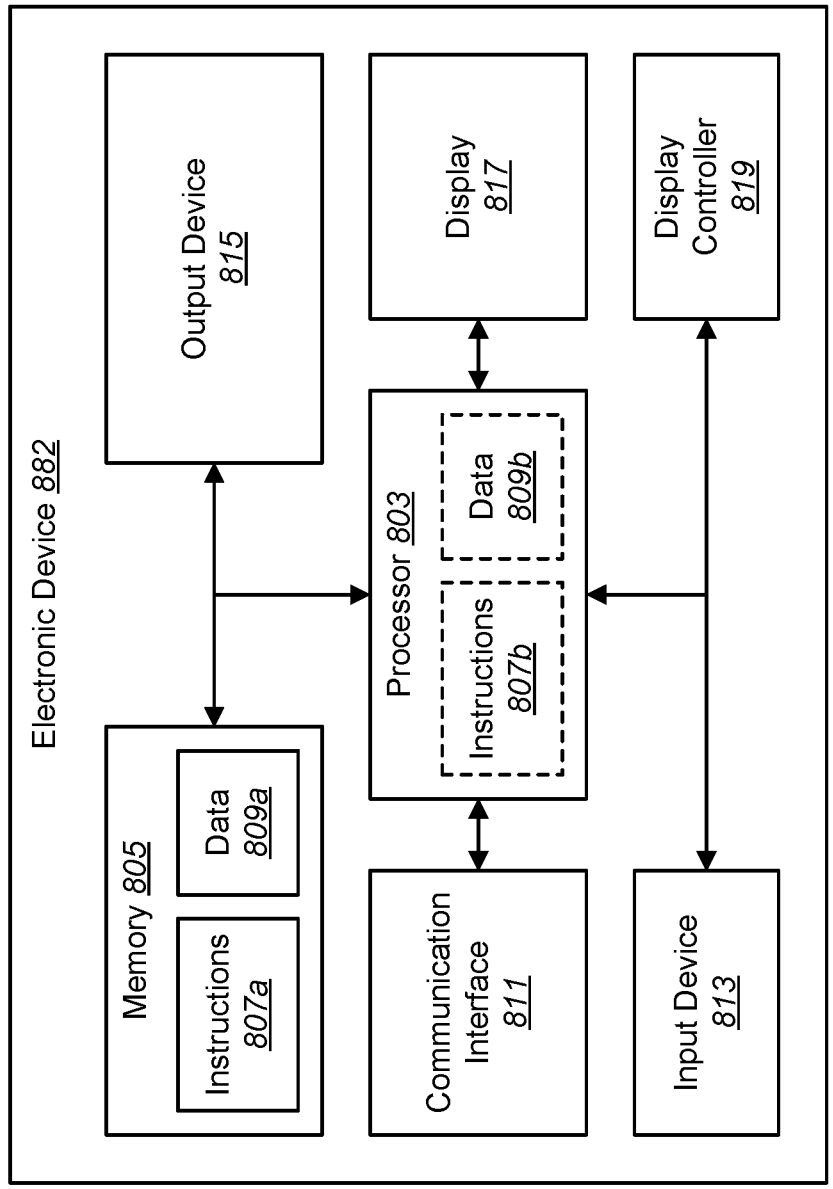
FIG. 8 illustrates various components that may be utilized in an electronic device.

FIG. 8 illustrates various components that may be utilized in an electronic device 882. The electronic device 882 may be configured in accordance with one or more of the computing devices 104 or servers 102 described herein.

The electronic device 882 may include a processor 803 and memory 805. The memory 805 may include instructions 807a and data 809a. The processor 803 controls the operation of the computing device and may be, for example, a microprocessor, a microcontroller, a digital signal processor (DSP) or other device known in the art. The processor 803 typically performs logical and arithmetic operations based on program instructions 807b and/or data 809b received from the memory 805.

The electronic device 882 typically may include one or more communication interfaces 811 for communicating with other electronic devices. The communication interfaces 811 may be based on wired communication technology, wireless communication technology or both. Examples of different types of communication interfaces 811 include a serial port, a parallel port, a Universal Serial Bus (USB), an Ethernet adapter, an Institute of Electrical and Electronics Engineers (IEEE) bus interface, a small computer system interface (SCSI) bus interface, an infrared (IR) communication port, a Bluetooth wireless communication adapter and so forth.

The electronic device 882 typically may include one or more input devices 813 and one or more output devices 815. Examples of different kinds of input devices 813 include a keyboard, mouse, microphone, remote control device, button, joystick, trackball, touchpad, lightpen, etc. Examples of different kinds of output devices 815 include a speaker, printer, etc. One specific type of output device 815 that may be included in a computer system is a display device 817. Display devices 817 used with configurations disclosed herein may utilize any suitable image projection technology, such as liquid crystal display (LCD), light-emitting diode (LED), gas plasma, electroluminescence, a cathode ray tube (CRT) or the like.

A display controller 819 may also be provided, for converting data 809a stored in the memory 805 into text, graphics and/or moving images (as appropriate) shown on the display device 817. Of course, FIG. 8 illustrates only one possible configuration of an electronic device 882. Various other architectures and components may be utilized.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, removable flash drives or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for configuring, via a website, a second computing device to communicate with a printer, comprising:
    receiving, at the website, a printer profile and a printer driver uploaded from a first computing device, the received printer profile comprising printer settings configured on the first computing device using the printer driver installed on the first computing device, wherein the website is hosted by a server that is accessible by the first computing device via the Internet;
    creating, via the website, a printer definition for the printer, wherein the printer definition comprises a network address, a reference to the printer driver uploaded from the first computing device, and a reference to the received printer profile;
    sending an email that includes a link with an install uniform resource identifier (URI) associated with the created printer definition, wherein the install URI specifies an access mechanism and a location for downloading a printer installer;
    receiving an indication that the emailed link with the install URI has been activated by a second computing device;
    dynamically generating, by a printer cloud engine module on the server, the printer installer to install the printer driver and configure the second computing device to communicate with the printer based on the created printer definition in response to receiving the indication that the emailed link with the install URI has been activated, wherein the printer cloud engine module is a software-as-a-service (SaaS) module that is separate from a printer cloud administration module on the server; and
    sending the generated printer installer to the second computing device, wherein the generated printer installer installs the printer driver and configures the second computing device to communicate with the printer using the network address, the printer driver, and the received printer profile.

2. The method of claim 1, wherein creating the printer definition comprises:
    receiving, via the website, the network address of the printer;
    receiving, via the website, the printer driver for the printer; and
    receiving, via the website, the printer profile for the printer.

3. The method of claim 1, wherein the printer driver is stored in a repository, and wherein the reference to the printer driver uploaded from the first computing device uniquely identifies the printer driver in the repository.

4. The method of claim 1, wherein the printer profile is stored in a repository, and wherein the reference to the received printer profile uniquely identifies the printer profile in the repository.

5. The method of claim 1, wherein the network address is an Internet Protocol (IP) address.

6. The method of claim 5, wherein the second computing device communicates with the printer via direct IP printing.

7. The method of claim 1, wherein the received printer profile comprises one or more customized printer settings.

8. The method of claim 7, wherein the one or more customized printer settings comprise one or more of tray options, paper options, paper sizes, duplex options, DPI settings, watermark options, name, comment, and location.

9. The method of claim 1, wherein configuring the second computing device to communicate with the printer comprises:
    creating a network printer port based on the network address; and
    configuring settings based on the received printer profile.

10. The method of claim 1, wherein a print service provider configures the received printer profile using the printer driver installed on the first computing device.

11. The method of claim 10, wherein the print service provider comprises a managed print service that provides print services to a user of the printer.

12. The method of claim 10, wherein the printer profile uploaded to the website comprises tray options, paper options, paper sizes and duplex options configured by the print service provider using the printer driver installed on the first computing device.

13. The method of claim 10, further comprising:
    receiving, from the print service provider via the website, an indication of computing devices that are to be configured to communicate with the printer; and
    maintaining a list of the computing devices that are to be configured to communicate with the printer in the created printer definition.

14. The method of claim 13, further comprising:
    providing, by the website, a client list that displays clients and printers that are associated with a given client; and
    receiving, from the print service provider via the website, a selection of the second computing device for deployment of the printer driver and the received printer profile.

15. An electronic device for configuring, via a website, a second computing device to communicate with a printer, comprising:
    at least one processor configured to:
    receive, at the website, a printer profile and a printer driver uploaded from a first computing device, the received printer profile comprising printer settings configured on the first computing device using the printer driver installed on the first computing device, wherein the website is hosted by a server that is accessible by the first computing device via the Internet;
    create, via the website, a printer definition for the printer, wherein the printer definition comprises a network address, a reference to the printer driver uploaded from the first computing device, and a reference to the received printer profile;
    send an email that includes a link with an install uniform resource identifier (URI) associated with the created printer definition, wherein the install URI specifies an access mechanism and a location for downloading a printer installer;
    receive an indication that the emailed link with the install URI has been activated by a second computing device;
    dynamically generate, by a printer cloud engine module, the printer installer to install the printer driver and configure the second computing device to communicate with the printer based on the created printer definition in response to receiving the indication that the emailed link with the install URI has been activated, wherein the printer cloud engine module is a software-as-a-service (SaaS) module that is separate from a printer cloud administration module; and send the generated printer installer to the second computing device, wherein the generated printer installer installs the printer driver and configures the second computing device to communicate with the printer using the network address, the printer driver, and the received printer profile.

16. The electronic device of claim 15, wherein the at least one processor configured to create the printer definition comprises the at least one processor configured to:

receive, via the website, the network address of the printer;

receive, via the website, the printer driver for the printer; and receive, via the website, the printer profile for the printer.

17. The electronic device of claim 15, wherein the printer driver is stored in a repository, and wherein the reference to the printer driver uploaded from the first computing device uniquely identifies the printer driver in the repository.

18. The electronic device of claim 15, wherein the printer profile is stored in a repository, and wherein the reference to the received printer profile uniquely identifies the printer profile in the repository.

19. A method for configuring, via a website, a second computing device to communicate with a printer, comprising:

receiving, via the website, a network address, a printer driver and a printer profile for the printer uploaded from a first computing device, the received printer profile comprising printer settings configured on the first computing device using the printer driver installed on the first computing device, wherein the website is hosted by a server that is accessible by the first computing device via the Internet;

creating a printer definition for the printer that includes the network address, a reference to the printer driver uploaded from the first computing device, and a reference to the received printer profile;

generating, by a printer cloud engine module, deployment rules to install the printer driver and configure the second computing device to communicate with the printer based on the created printer definition, wherein the deployment rules include an install uniform resource identifier (URI) associated with the printer definition, wherein the install URI specifies an access mechanism and a location for downloading a printer installer, wherein the printer cloud engine module is a software-as-a-service (SaaS) module that is separate from a printer cloud administration module; and sending the generated deployment rules to a printer cloud client on the second computing device to install the printer driver and received printer profile for the printer.

20. The method of claim 19, wherein creating the printer definition comprises creating the reference to the printer driver uploaded from the first computing device and the reference to the received printer profile.

21. The method of claim 20, wherein the printer driver is stored in a repository, and wherein the reference to the printer driver uploaded from the first computing device uniquely identifies the printer driver in the repository.

22. The method of claim 20, wherein the printer profile is stored in a repository, and wherein the reference to the received printer profile uniquely identifies the printer profile in the repository.

23. The method of claim 19, wherein the generated deployment rules comprise instructions for the printer cloud client on the second computing device to install and configure the printer driver and the received printer profile for the printer.

24. The method of claim 19, wherein the printer cloud client is a software agent that exists on the second computing device and is configured to communicate with a server via the Internet.

25. An electronic device for configuring, via a website, a second computing device to communicate with a printer, comprising:

at least one processor configured to:

receive, via the website, a network address, a printer driver and a printer profile for the printer uploaded from a first computing device, the received printer profile comprising printer settings configured on the first computing device using the printer driver installed on the first computing device, wherein the website is hosted by a server that is accessible by the first computing device via the Internet;

create a printer definition for the printer that includes the network address, a reference to the printer driver uploaded from the first computing device, and a reference to the received printer profile;

generate, by a printer cloud engine module, deployment rules to install the printer driver and configure the second computing device to communicate with the printer based on the created printer definition, wherein the deployment rules include an install uniform resource identifier (URI) associated with the printer definition, wherein the install URI specifies an access mechanism and a location for downloading a printer installer, wherein the printer cloud engine module is a software-as-a-service (SaaS) module that is separate from a printer cloud administration module; and send the generated deployment rules to a printer cloud client on the second computing device to install the printer driver and received printer profile for the printer.

26. The electronic device of claim 25, wherein the at least one processor configured to create the printer definition comprises the at least one processor configured to create the reference to the printer driver uploaded from the first computing device and the reference to the created printer profile.

27. The electronic device of claim 26, wherein the printer driver is stored in a repository, and wherein the reference to the printer driver uploaded from the first computing device uniquely identifies the printer driver in the repository.

28. The electronic device of claim 26, wherein the printer profile is stored in a repository, and wherein the reference to the received printer profile uniquely identifies the printer profile in the repository.

29. The electronic device of claim 25, wherein the generated deployment rules comprise instructions for the printer cloud client on the second computing device to install and configure the printer driver and the received printer profile for the printer.

30. The electronic device of claim 25, wherein the printer cloud client is a software agent that exists on the second computing device and is configured to communicate with a server via the Internet.

* * * * *